United States Patent
Kim

(10) Patent No.: US 12,420,635 B2
(45) Date of Patent: Sep. 23, 2025

(54) VEHICLE INTEGRATED CONTROLLER AND VEHICLE FUNCTION IMPLEMENTATION METHOD USING THE SAME

(71) Applicants: HYUNDAI MOTOR COMPANY, Seoul (KR); KIA CORPORATION, Seoul (KR)

(72) Inventor: Yu-Mi Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 261 days.

(21) Appl. No.: 18/105,635

(22) Filed: Feb. 3, 2023

(65) Prior Publication Data

US 2024/0109414 A1    Apr. 4, 2024

(30) Foreign Application Priority Data

Sep. 30, 2022    (KR) .......... 10-2022-0125498

(51) Int. Cl.
*B60K 35/00* (2024.01)
*B60K 35/10* (2024.01)
(Continued)

(52) U.S. Cl.
CPC ............. *B60K 35/00* (2013.01); *B60K 35/10* (2024.01); *B60K 35/29* (2024.01); *B60K 35/81* (2024.01);
(Continued)

(58) Field of Classification Search
CPC ........ B60K 35/00; B60K 35/10; B60K 35/29; B60K 35/81; B60K 2360/1438;
(Continued)

(56) References Cited

U.S. PATENT DOCUMENTS

| | | | |
|---|---|---|---|
| 2017/0269774 A1* | 9/2017 | Ben Abdelaziz | ........ B60Q 3/14 |
| 2021/0107400 A1* | 4/2021 | Erler | ...................... B60Q 3/217 |
| 2022/0111731 A1* | 4/2022 | Zhao | ...................... B60K 35/80 |

FOREIGN PATENT DOCUMENTS

| | | |
|---|---|---|
| CN | 108784384 A | 11/2018 |
| JP | H08258541 A | 10/1996 |

(Continued)

*Primary Examiner* — Ramya P Burgess
*Assistant Examiner* — Ana D Thomas
(74) *Attorney, Agent, or Firm* — Lempia Summerfield Katz LLC

(57) ABSTRACT

A vehicle integrated controller includes: a board; an integrated pattern part positioned on the board; a touch integrated circuit (IC) part connected to the integrated pattern part to detect a change in a charge amount of the integrated pattern part; and a controller connected to the touch IC part and outputting an operation signal of a function corresponding to the change in a charge amount. A plurality of function patterns are arranged separately in the integrated pattern part. Each function pattern is configured to operate a plurality of different functions of a vehicle. The vehicle integrated controller may integrate switches having different functions with each other to display and implement the functions and may have a smaller overall size and a minimum number of touch input errors.

10 Claims, 6 Drawing Sheets

(51) Int. Cl.
*B60K 35/29* (2024.01)
*B60K 35/81* (2024.01)

(52) U.S. Cl.
CPC ............... *B60K 2360/1438* (2024.01); *B60K 2360/197* (2024.01); *B60K 2360/332* (2024.01)

(58) Field of Classification Search
CPC ........ B60K 2360/197; B60K 2360/332; B60K 2360/139; B60K 2360/42; B60K 35/80; H03K 17/96; H03K 2217/96015; G06F 3/0416; G06F 3/046
See application file for complete search history.

(56) References Cited

FOREIGN PATENT DOCUMENTS

| | | | |
|---|---|---|---|
| KR | 20110112714 A | 10/2011 | |
| KR | 20120032583 A | 4/2012 | |
| KR | 20120059272 A | 6/2012 | |
| KR | 20140075856 A | 6/2014 | |
| KR | 20210144310 A | 11/2021 | |

\* cited by examiner

VEHICLE INTEGRATED CONTROLLER AND VEHICLE FUNCTION IMPLEMENTATION METHOD USING THE SAME

CROSS-REFERENCE TO RELATED APPLICATION

This application claims priority to Korean Patent Application No. 10-2022-0125498, filed on Sep. 30, 2022, which is incorporated herein by reference in its entirety.

BACKGROUND

Field of the Disclosure

The present disclosure relates to a vehicle controller for controlling an additional function of a vehicle and a vehicle function implementation method using the same.

Description of Related Art

An additional function of a vehicle may be implemented by inputting a function to be selected through a button or a touch screen positioned on a vehicle center fascia. An input signal through this input means may be input to a controller through an integrated circuit (IC), thereby implementing a corresponding function.

In recent years, there has been a trend to delete an exterior part of a switch in the vehicle center fascia and integrate switches having different functions with each other to thus implement seamless styling, or the like.

Prior art related to switch integration technology is being developed and is technology for providing an integrated switch (e.g., a heater control/audio, video & navigation (AVN) keyboard) having different functions on one printed circuit board (PCB).

The different functions may include heating, ventilating & air conditioning (HVAC) functions and the AVN functions.

However, the number of switches may not be reduced because it is necessary to display input buttons for selecting the air conditioning function and the AVN function separately from each other. Therefore, there is a limit to slimming down the switch even though the switch has top and bottom heights smaller than those of a conventional switch by deleting its structure for mounting each part. In addition, vehicle cost may be increased because an expensive internal device is used to position more switches on one PCB.

Prior art related to the switch integration technology is technology for implementing a (heater control/audio control) switch that performs different functions by adding a thin film transistor (TFT) liquid crystal display (LCD) and a changeover switch button, as shown in FIG. 1.

The changeover switch button is provided for selecting the air conditioning function or the AVN function. The changeover switch button may also display the air conditioning function on an upper portion of the screen and the AVN function on a lower portion thereof.

Here, fewer visible switches may be used because the switches are switched and displayed on a LCD screen. The switches may thus be slimmed down by deleting their exterior parts. However, there is a limit in that the vehicle cost may be excessively increased by using the TFT LCD.

As such, only the changeover switch may be applied while the switches having different functions are integrated into one controller. In this case, for example, a first pattern 12 for a heater control function and a second pattern 13 for an audio function may be separately positioned on a PCB, i.e., a board 11, as shown in FIG. 2. Switch symbols and patterns may respectively be printed on an in-mold labeling (IML) film (including a transparent printing layer 14, a masking printing layer 15, and a transparent film layer 16). Switch symbols and patterns may also display separate functions based on a selection of the changeover switch, as shown in FIG. 3.

A touch pattern of the prior art is required to secure a minimum separation distance between the patterns. Here, as shown in FIG. 3, a dummy switch between modes shown through a switching function may occur as the separation distance is increased.

Operation logic may transmit a change in a charge amount to a touch integrated circuit (IC) when the switch is touched. A microcomputer (MICOM) may determine operation/non-operation of the switch based on the change in the charge amount by the input touch and an ON state of the symbol.

In this case, more touch failure may occur because a region where the change in the charge amount by the touch is not recognized may increase as a touch pattern is smaller.

In addition, the MICOM may make a determination only based on an ON/Off state of the symbol. It is to be recognized as a failure when a region where the symbol is OFF is touched. Therefore, the number of touch failures may be more than doubled compared to that of a general touch heater control. In addition, each touch pattern is necessary to be printed for every function switch. The touch ICs are thus also necessary to be arranged and added based on the number of switches.

In other words, referring to FIGS. 4 and 5, a switch 'B' may be pressed instead of a switch 'A' which is to be pressed in a state where a mode A is turned on as shown in FIG. 4. In this case, the touch IC connected to the second pattern 13 corresponding to the switch 'B' may detect the change in the charge amount. However, the MICOM does not output a switch operation signal because there is no voltage change for the first pattern 12 corresponding to the switch 'A'.

Similarly, the switch 'A' may be pressed instead of the switch 'B', which is to be pressed in a state where a mode B is turned on as shown in FIG. 5. In this case, the touch IC connected to the first pattern 12 corresponding to the switch 'A' may detect the change in the charge amount. However, the MICOM does not output a switch operation signal because there is no voltage change for the second pattern 13 corresponding to the switch 'B'.

The contents described above should help in understanding the Background and may include what is not previously known to those having ordinary skill in the art to which the present disclosure pertains.

SUMMARY OF THE DISCLOSURE

The present disclosure has been made in an effort to solve the above problems. Objects of the present disclosure is to provide a vehicle integrated controller that integrates switches having different functions with each other to display and implement the functions, reduce overall size, minimize touch input errors, and provide a vehicle function implementation method using the same.

According to one aspect of the present disclosure, a vehicle integrated controller includes: a board; an integrated pattern part positioned on the board; a touch integrated circuit (IC) part connected to the integrated pattern part to detect a change in a charge amount of the integrated pattern part; and a controller connected to the touch IC part and outputting an operation signal of a function corresponding to the change in a charge amount.

A plurality of function patterns are arranged separately in the integrated pattern part and each function pattern is configured to operate a plurality of different functions of a vehicle.

The plurality of different functions may be classified for each function mode. The integrated pattern part may include a changeover switch pattern for switching the function mode.

The controller may determine an input function mode through a change in a charge amount of the changeover switch pattern.

The controller may output an operation signal of a function corresponding to the input function mode among the plurality of different functions corresponding to the function patterns when a change in a charge amount of the function patterns is detected.

The controller may further include: an in-mold labeling (IML) film part attached to the integrated pattern part; and a light emitting part disposed on a rear surface of the board. The IML film part includes a masking part for blocking light emitted from the light emitting part and a transparent film part positioned on an upper surface of the masking part.

The masking part may be positioned not to cover regions where a changeover switch symbol corresponding to the changeover switch pattern and a plurality of function symbols corresponding to the plurality of function patterns are arranged.

The plurality of function symbols representing the plurality of different functions may be displayed through the IML film part corresponding to the function pattern.

The plurality of light emitting parts may be arranged separately for each function mode. The controller may perform control to turn on the light emitting part corresponding to the input function mode among the plurality of the light emitting parts.

A vehicle function implementation method using a vehicle integrated controller according to another aspect of the present disclosure includes: detecting a change in a charge amount of a function pattern of a vehicle integrated controller; determining an input function mode through a change in a charge amount of a changeover switch pattern when the change in the charge amount of the function pattern is detected; and outputting an operation signal of a function corresponding to the input function mode determined in the determining of the input function mode among a plurality of different functions corresponding to the function pattern in which the change in the charge amount of the function pattern is detected.

The method, in which a plurality of light emitting parts arranged separately for each function mode is disposed on a rear surface of a board of the vehicle integrated controller, may further include controlling, by the controller, the light emitting part corresponding to the function mode determined in the determining of the function mode among the plurality of light emitting parts to be turned on.

DESCRIPTION OF SPECIFIC EMBODIMENTS

In order to sufficiently understand the present disclosure, operational advantages of the present disclosure, and objects accomplished by embodiments of the present disclosure, one should refer to the accompanying drawings illustrating embodiments of the present disclosure and to contents described in relation to the accompanying drawings.

In describing embodiments of the present disclosure, well-known techniques or repetitive descriptions that may unnecessarily obscure the gist of the present disclosure have been minimized or omitted.

Figure 1:
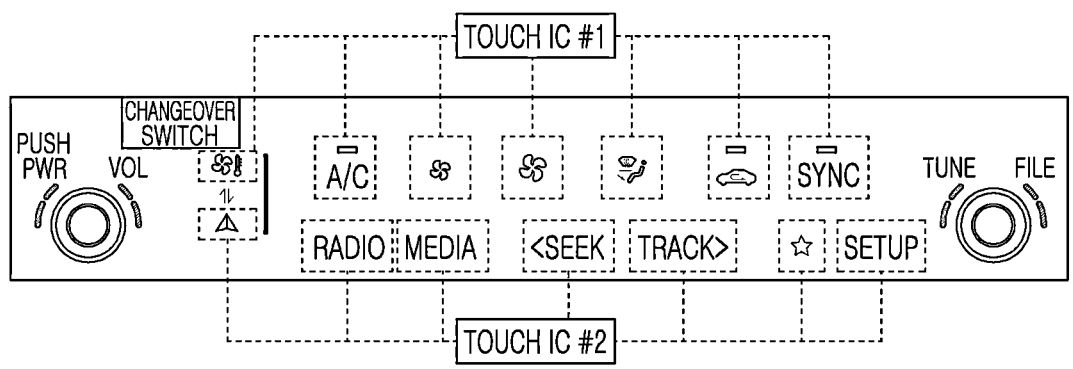
FIG. 1 shows an example of prior switch integration technology.
Figure 2:
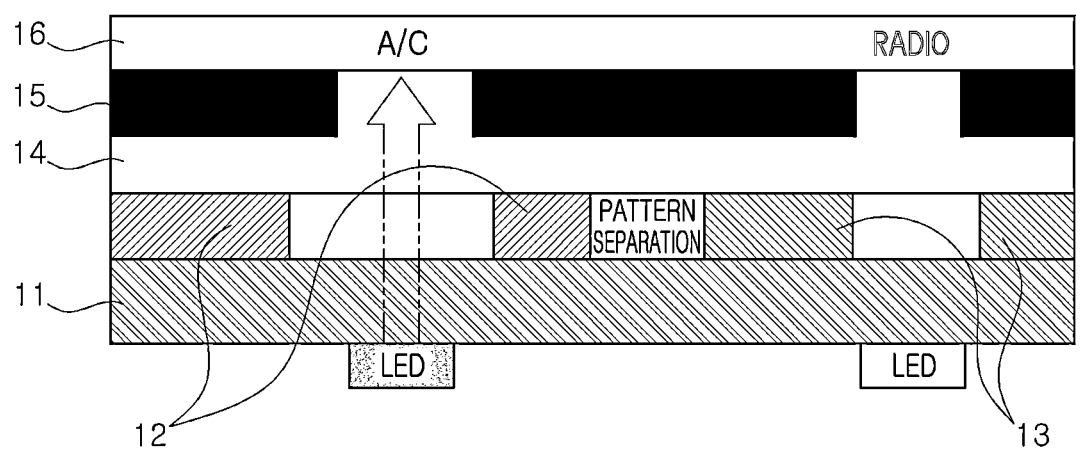
FIG. 2 schematically shows a cross section of a controller according to the prior switch integration technology.
Figure 3:
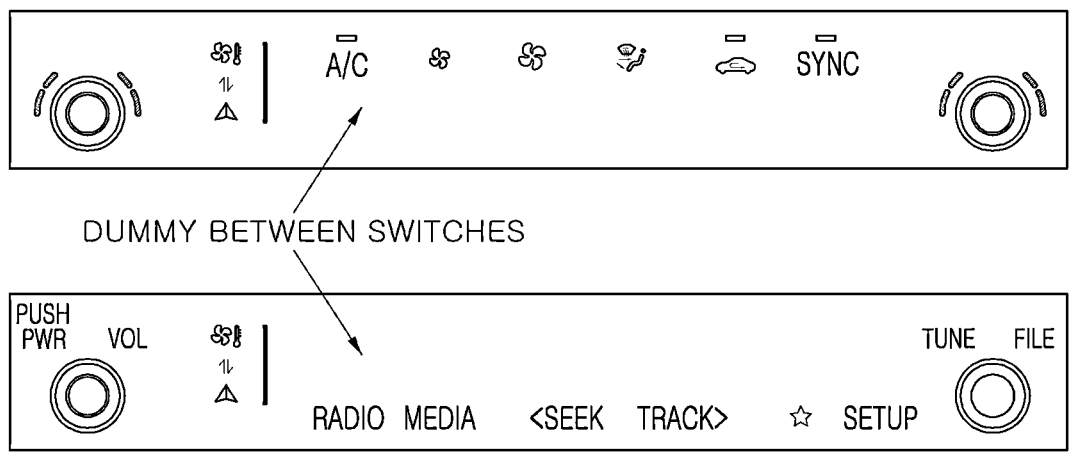
FIG. 3 shows a display example provided by the prior switch integration technology.
Figure 4:
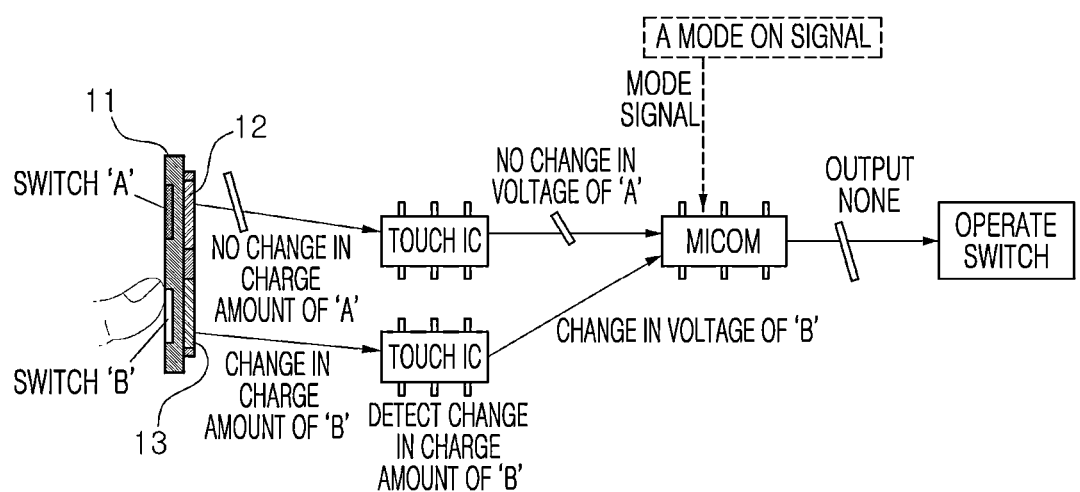
FIGS. 4 and 5 show respective examples of erroneous operations according to the prior switch integration technology.
Figure 5:
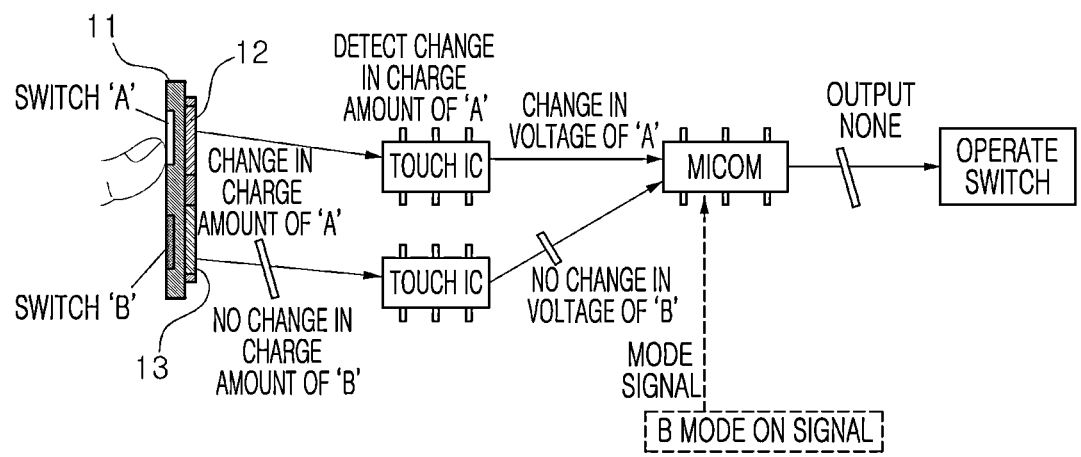
Figure 6:
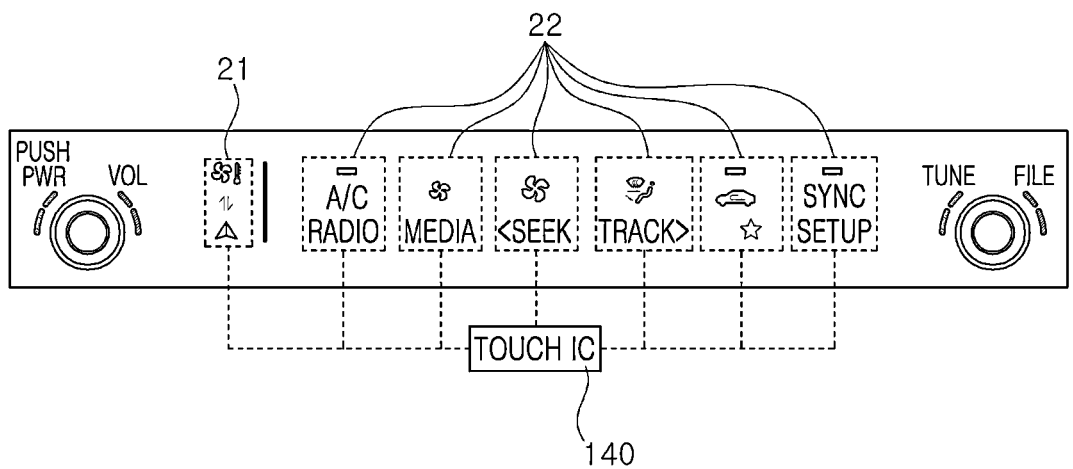
FIG. 6 shows a display state of a vehicle integrated controller of the present disclosure.
Figure 7:
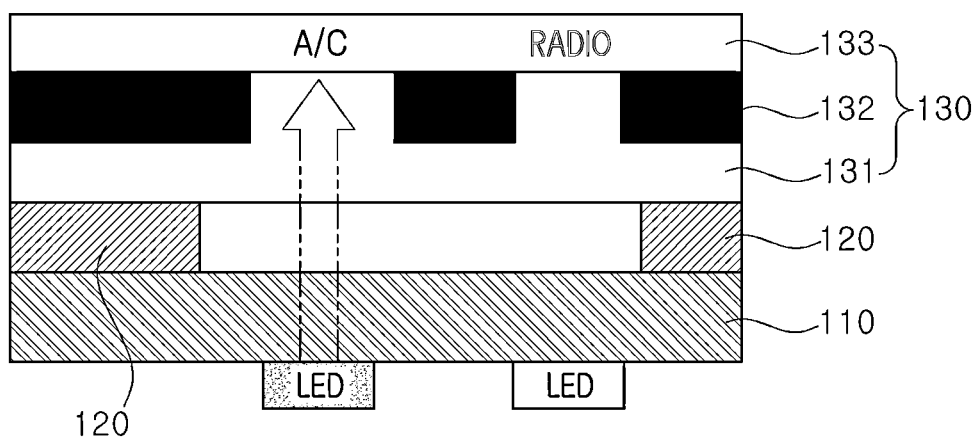
FIG. 7 schematically shows a cross section of the vehicle integrated controller of the present disclosure.
Figure 8:
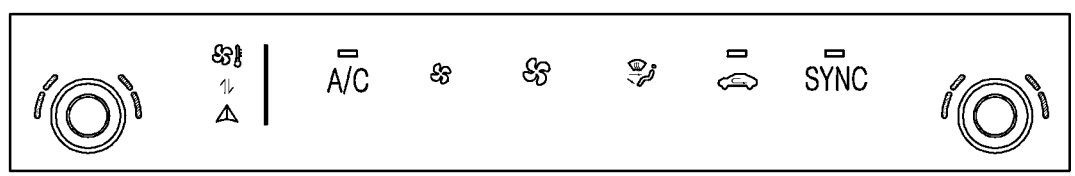
FIG. 8 shows a display example provided by the vehicle integrated controller of the present disclosure.
Figure 8:

FIG. 6 shows a display state of a vehicle integrated controller of the present disclosure FIG. 7 schematically shows a cross section of the vehicle integrated controller of the present disclosure. FIG. 8 shows a display example provided by the vehicle integrated controller of the present disclosure.

Hereinafter, the description describes the vehicle integrated controller and a vehicle function implementation method using the same according to an embodiment of the present disclosure with reference to FIGS. 6-8.

The present disclosure provides a controller structure for selectively implementing two or more functions by applying an integrated touch pattern and a changeover switch to one controller.

The controller structure may be implemented with the integrated touch pattern where an in-mold labeling (IML) film is attached to the top of a controller injection molding so that only a symbol implementing a function is selectively shown. Also, a mode-only changeover switch for selecting a function is added, an integrated touch integrated circuit (IC) determines a selected function, and detailed determination logic and the touch IC are integrated with each other.

The technical concept of the present disclosure is intended to resolve a touch failure occurring when the switches are integrated with each other, which is a limitation of the prior art. The technical concept of the present disclosure may secure a touch region that is twice, or more, larger than an insufficient touch region in the prior art by integrating individually separated touch patterns for each switch with each other based on a function mode. Here, the number of patterns may be reduced by more than half when the touch patterns are integrated with each other. It is thus possible to integrate the touch ICs into one. However, individual switches in the integrated pattern may not be recognized when the individually separated touch patterns are integrated with each other. To solve this problem, integrated touch IC logic, which is mode-based determination logic, may be added to individually recognize a switch in the integrated touch pattern. This logic may be used to reduce the logic delay time of a switchable controller.

The touch patterns of the function switches may be integrated with each other. A pattern separation distance that was required to be secured between the patterns may thus be eliminated from the touch pattern of the present disclosure. Accordingly, it is possible to minimize eccentricity occurring between the function modes of the switches. The entire controller may thus be smaller and slimmer by the eliminated pattern separation distance.

FIG. 6 is a front view of the controller displayed through a center fascia, or the like, on which a changeover switch symbol 21 and a function symbol 22 are displayed. Here, both function modes are displayed for explanation. The function modes may be classified into three or more.

The two function modes may be, for example, a function mode 'A' and a function mode A function symbol 'A' may be displayed in a line in an upper portion of the touch pattern, and a function symbol 'B' may be displayed in a line in a lower portion thereof.

For example, a function 'A' may be an air conditioning function, a function 'B' may be an audio, video & navigation (AVN) function, and the changeover switch may select the function mode 'A' or the function mode 'B'.

In more detail, as shown in FIG. 7, an integrated pattern part 120 may be positioned on a board 110 that is injection-manufactured and made of polycarbonate (PC) material.

In addition, a light emitting part made of a light emitting diode (LED) material may be disposed on a rear surface of the board 110. Each light emitting part may correspond to the function symbol 22 of the function 'A' or the function 'B'. An LED corresponding to the function symbol 'A' or the function symbol 'B' may be turned on based on a function mode input by touching the changeover switch symbol 21.

An IML film part 130 may be attached to the integrated pattern part 120. The IML film part 130 may include a transparent layer 131, a masking part 132, and a transparent film part 133 sequentially stacked on the integrated pattern part 120.

The masking part 132 may be formed in such a manner that the masking part 132, which is a black printed layer, is positioned on the transparent layer 131. The transparent film part 133 is positioned on an upper surface of the masking part 132 Portions of the transparent layer 131, not covered by the masking part 132, are then displayed. These parts, not covered by the masking part 132, have shapes of the changeover switch symbol 21 and the function symbol 22.

In addition, the masking parts 132 may each be positioned on a part except for the shape or character representing the function symbol 'A' or the function symbol thus displaying the function symbol 'A' or the function symbol 'B' by selective light emission of the LED.

The integrated pattern part 120 may be the touch pattern and connected to one touch IC part 140. The touch IC part 140 may be electrically connected to a controller 150.

The integrated pattern part 120 may include a changeover switch pattern corresponding to the changeover switch symbol 21 and a plurality of function patterns corresponding to the plurality of function symbols 22.

In the case of the changeover switch pattern, the selection of the function mode 'A' or the function mode 'B' may be input to the controller 150 through the touch IC part 140 based on a touch input of the changeover switch symbol 21.

In the case of the function pattern, a touch may be input to a corresponding pattern region. A selection signal of a function may then be input to the controller 150 through the touch IC part 140. The controller 150 may then output an operation signal of the function and transmit the same to a corresponding function controller.

Here, the plurality of function patterns in the present disclosure may be classified and arranged in a line. The following respective function patterns may be implemented as the same pattern: one pattern corresponding to the function 'A', and another pattern corresponding to the function 'B'.

For example, the following function patterns may be provided as the same pattern: a function pattern displaying an air controller (A/C) function symbol corresponding to the function mode 'A'; and another function pattern displaying a radio part function symbol corresponding to the function mode 'B'.

Therefore, the plurality of function patterns may be connected to the integrated touch IC part 140 instead of the touch IC parts classified into the function mode 'A' and the function mode 'B'.

Figure 9:
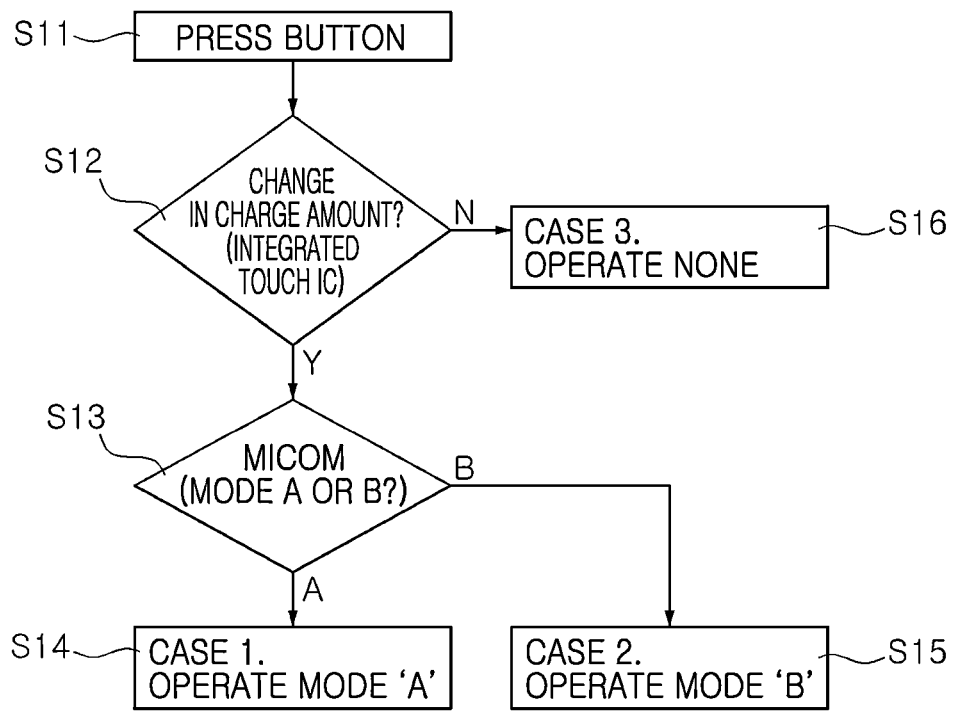
FIG. 9 shows a vehicle function implementation method using a vehicle integrated controller of the present disclosure.

In the present disclosure, the control as shown in FIG. 9 is possible as described above by the function pattern in which two functions of different modes are integrated into one pattern, the integrated touch IC part 140, and the controller 150.

In other words, an input button may be pressed (S11). The touch IC part 140 may then detect whether a charge amount of a corresponding function is changed (S12). The controller 150 may determine whether the change corresponds to the function mode 'A' or the function mode 'B' (S13) when the change in a charge amount is detected. The controller 150 may control the corresponding function not to be operated (S16) when no change in the charge amount is detected.

The controller 150 may determine whether the function mode 'A' is ON or the function mode 'B' is ON based on a mode signal pre-input through the changeover switch symbol 21. The controller 150 may also control the function 'A' corresponding to a corresponding function pattern to be operated (S14) among the functions A and B, when a change in a charge amount of one function pattern is detected by a touch of the function symbol 22, in a state where the function mode 'A' is ON. The controller 150 may also control the function 'B' corresponding to a corresponding function pattern to be operated (S15) among the input functions A and B, when the change in a charge amount of one function pattern is detected by a touch of the function symbol 22, in a state where the function mode 'B' is ON.

Figure 10:
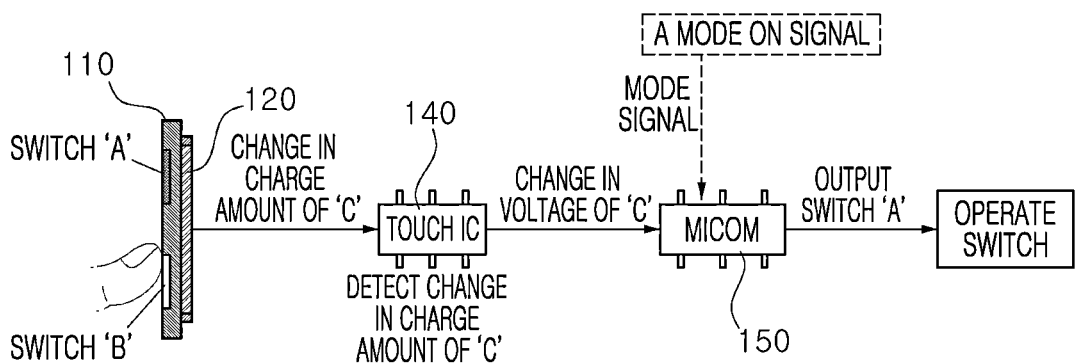
FIGS. 10 and 11 show operation examples provided by the vehicle integrated controller of the present disclosure.
Figure 11:
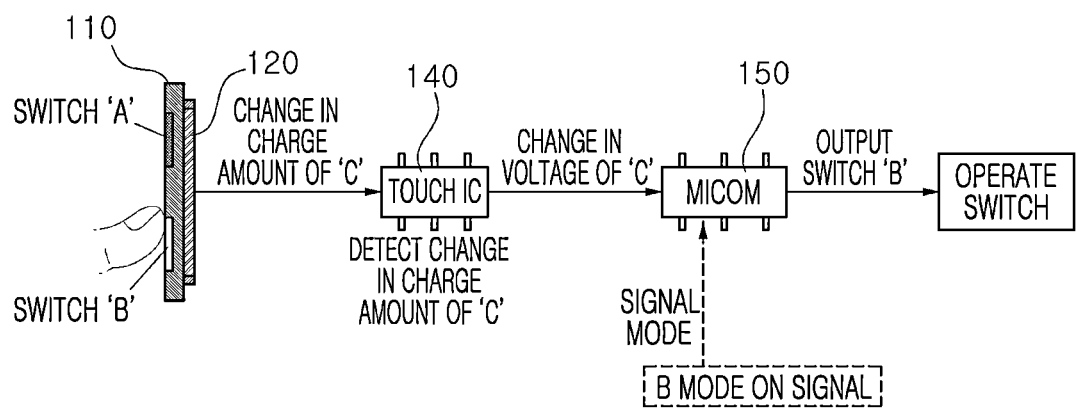

FIGS. 10 and 11 show operation examples provided by the vehicle integrated controller of the present disclosure.

Referring to FIG. 10, the touch IC part 140 may detect a change in a charge amount of a sensor 'C' by the integrated pattern part 120 when a touch on a specific function symbol 22 is input in a state where the function mode 'A' is ON. The controller 150 may then output an operation signal of the function 'A' even if a touch on a region of the function symbol 22, close to the function symbol 'B', is input when a voltage change of the sensor 'C' is detected.

Similarly, referring to FIG. 11, the touch IC part 140 may detect a change in a charge amount of the sensor 'C' by the integrated pattern part 120 when a touch on the function symbol 22 is input in a state where the function mode 'B' is ON. The controller 150 may then output an operation signal of the function 'B' even if a touch on a region of the function symbol 22, close to the function symbol 'A', is input when a voltage change of the sensor 'C' is detected.

As set forth above, according to the vehicle integrated controller and the vehicle function implementation method using the same, it is possible to integrate the subdivided touch regions for each function into one and to expand the region. Operation convenience is thereby increased, erroneous operation is thereby prevented, touch errors are thereby reduced, and fewer touch regions and touch ICs are thereby employed.

Further, it is possible to reduce the processing time through the integrated touch pattern logic, compared to the conventional logic that controls, based on the position of the touch part and the ON/OFF state of the symbol lighting. A more multifunctional part with a more advantageous structure is thereby provided.

Furthermore, it is possible to reduce the symbol eccentricity by minimizing the gap between the symbols. An improved exterior is thereby provided ultimately contributing to the multifunction switchable controller being slimmed down.

Thus, the fewer touch ICs may be useful for reducing vehicle cost and increasing consumer convenience.

Although the technical concept of the present disclosure has been described with reference to the accompanying drawings, it should be apparent to those having ordinary skill in the art that the present disclosure is not limited to the embodiments described above. The embodiments may be variously modified and altered without departing from the spirit and scope of the present disclosure. Therefore, these modifications and alterations are to be considered to within the scope of the claims, and the scope of the present disclosure is to be interpreted based on the claims.

What is claimed is:

1. A vehicle integrated controller comprising:
   a board;
   an integrated pattern part positioned on the board;
   a touch integrated circuit (IC) part connected to the integrated pattern part and configured to detect a change in a charge amount of the integrated pattern part; and
   a controller connected to the touch IC part and configured to output an operation signal of a function corresponding to the change in a charge amount,
   wherein a plurality of function patterns is arranged separately in the integrated pattern part,
   wherein each function pattern is configured to operate a plurality of different functions of a vehicle,
   wherein, in the integrated pattern part, among the plurality of function patterns, function patterns of a same function mode are arranged in one direction and function patterns of a different function mode are arranged in a different direction, and
   wherein the integrated pattern part includes a changeover switch pattern configured to switch among function modes.

2. The vehicle integrated controller of claim 1, wherein the plurality of different functions is classified for each of the function modes.

3. The vehicle integrated controller of claim 1, wherein the controller is configured to determine an input function mode of the function modes through a change in a charge amount of the changeover switch pattern.

4. The vehicle integrated controller of claim 3, wherein the controller is configured to output an operation signal of a function corresponding to the input function mode among the plurality of different functions corresponding to the plurality of function patterns when a change in a charge amount of the plurality of function patterns is detected.

5. The vehicle integrated controller of claim 3, wherein a plurality of light emitting parts is arranged separately for each input function mode, and
   the controller is configured to perform control to turn on the light emitting part corresponding to the input function mode among the plurality of the light emitting parts.

6. A vehicle function implementation method using the vehicle integrated controller of claim 4, the method comprising:
   detecting a change in a charge amount of the plurality of function patterns of the vehicle integrated controller;
   determining the input function mode through a change in a charge amount of the changeover switch pattern when the change in the charge amount of the plurality of function patterns is detected; and
   outputting an operation signal of a function corresponding to the input function mode determined in the determining of the input function mode among a plurality of different functions corresponding to the plurality of function patterns in which the change in the charge amount of the plurality of function patterns is detected.

7. The method of claim 6, wherein a plurality of light emitting parts arranged separately for each of the function modes is disposed on a rear surface of a board of the vehicle integrated controller, the method further comprising:
   controlling, by the controller, the light emitting part corresponding to the input function mode determined in the determining of the input function mode among the plurality of light emitting parts to be turned on.

8. The vehicle integrated controller of claim 1, further comprising:
   an in-mold labeling (IML) film part attached to the integrated pattern part; and
   a light emitting part disposed on a rear surface of the board,
   wherein the IML film part includes a masking part configured to block light emitted from the light emitting part and a transparent film part positioned on an upper surface of the masking part.

9. The vehicle integrated controller of claim 8, wherein the masking part is positioned not to cover regions where a changeover switch symbol corresponding to the changeover switch pattern and a plurality of function symbols corresponding to the plurality of function patterns is arranged.

10. The vehicle integrated controller of claim 9, wherein the plurality of function symbols configured to represent the plurality of different functions is displayed through the IML film part corresponding to the plurality of function patterns.

* * * * *